United States Patent [19]

Ingham

[11] Patent Number: 4,941,174

[45] Date of Patent: Jul. 10, 1990

[54] DIGITAL RADIO WITH SECURITY SYSTEM FOR SELECTIVELY ENABLING SOFTWARE CONTROLLED OPTIONS

[75] Inventor: Scott W. Ingham, Forrest, Va.

[73] Assignee: General Electric Company, Lynchburg, Va.

[21] Appl. No.: 183,212

[22] Filed: Apr. 19, 1988

[51] Int. Cl.$^5$ .............................................. H04K 1/00
[52] U.S. Cl. .................................. 380/52; 340/825.31
[58] Field of Search ....................... 380/52, 23, 25, 48, 380/4; 340/825.31, 825.5; 364/222.5, 929.2, 929.4

[56] References Cited

U.S. PATENT DOCUMENTS

| | | |
|---|---|---|
| 4,247,951 | 0/1981 | Hattori et al. . |
| 4,254,504 | 0/1981 | Lewis et al. . |
| 4,378,551 | 0/1983 | Drapac . |
| 4,392,135 | 0/1983 | Ohyagi . |
| 4,471,216 | 9/1984 | Herve ..................................... 380/25 |
| 4,484,355 | 11/1984 | Henke et al. ........................... 455/76 |
| 4,510,623 | 0/1985 | Bonneau et al. . |
| 4,525,865 | 0/1985 | Mears . |
| 4,618,997 | 0/1986 | Imazeki et al. . |
| 4,638,120 | 1/1987 | Herve ..................................... 380/25 |
| 4,688,261 | 0/1987 | Killoway et al. . |
| 4,691,355 | 9/1987 | Wirstrom et al. ..................... 380/25 |
| 4,771,399 | 9/1988 | Snowden et al. ..................... 364/900 |

OTHER PUBLICATIONS

The μP: The Key to an Advanced Frequency Synthesized HF SSB Amateur Radio Transceiver, Robert M. Groh, Benton Harbor, MI 49022, IEEE Transactions on Consumer Electronics, vol. 26 (Aug. 1980), pp. 232–246.

Dyna TAC 6000X Universal Mobile Telephone, Motorola, Schaumburg, IL 60196.

Primary Examiner—Thomas H. Tarcza
Assistant Examiner—David Cain
Attorney, Agent, or Firm—Nixon & Vanderhye

[57] ABSTRACT

Different digital radio transceiver front panel escutcheon plate modules are provided for different optional transceiver configurations. A security circuit is provided in each module in addition to user controls and associated circuitry. The security circuit is connected to communicate serial data signals to and from a digital signal controller which is part of the main transceiver circuitry. The controller is capable of performing any of various basic and option functions under control of program control instructions stored in an associated non-volatile memory. Upon initial application of power to the transceiver, the controller transmits a sequence of digital signals to the security circuit. The security circuit permutes the sequence of signals into a different sequence, the specific permutation used being arbitrarily complex—and dependent on transceiver "option" features to be enabled. The security circuit communicates the permuted signal sequence back to the controller. The controller enables (executes) portions of the program control instructions stored in its associated non-volatile memory and disables (does not execute) other portions of the stored program control instructions in response to the sequence received from the security circuit.

11 Claims, 7 Drawing Sheets

2 CHANNEL
TYPE 99 DECODE

128 CHANNEL, SCAN

16 CHANNEL, SCAN

2 CHANNEL, PA

16 CHANNEL, SCAN, PA

16 CHANNEL, SCAN, TYPE 99 DECODE

DIGITAL RADIO WITH SECURITY SYSTEM FOR SELECTIVELY ENABLING SOFTWARE CONTROLLED OPTIONS

CROSS-REFERENCE TO RELATED APPLICATIONS

This application is related to commonly assigned U.S. Design patent application Ser. Nos. 183,168 (attorney docket no. 46-91) entitled "Control Head For A Radio" and 183,162 (attorney docket no. 46-105) entitled "Two-Way Radio" both filed concurrently herewith in the name of Dickson. The entire disclosures of those two design applications are expressly incorporated by reference herein.

FIELD OF THE INVENTION

This invention is related to digital radio communications devices. More particularly, the invention relates to radio communications device security arrangements which permit a user to access standard communications functions (as well as additional "option" functions the user requests at time of purchase of the radio) while preventing the user from accessing additional "option" functions not requested at time of purchase. Still more particularly, the invention relates to software controlled digital radio transceivers which perform various functions under control of internally stored program control instructions, and arrangements for selectively enabling certain such functions and inhibiting certain other such functions based on security circuitry provided in the transceiver.

BACKGROUND AND SUMMARY OF THE INVENTION

For marketing and other reasons, manufacturers of radio communications devices typically offer several different configurations for each communications product manufactured. A particular model of mobile radio transceiver may have a "basic" or minimal configuration but may optionally be provided with additional features or "options" at additional cost.

For example, a basic transceiver configuration may provide communications over a limited number of communications channels for basic radio transmitting and receiving functions required by all users. Some users may, however, have additional requirements requiring additional features—such as additional communications channels, receiver channel scanning, public address capability, and tone activated squelch. The ability of a manufacturer to provide such additional "options" permits increases in the flexibility, versatility, desirability and range of applications of the product without penalizing purchasers of the basic configuration with increased cost. Purchasers of the basic model pay a minimum price for the minimal configuration, while users requiring additional "option" features pay an increased price based on the number and type of options required.

In the past, additional options were generally provided by incorporating additional components and circuitry into the device. For example, in the past channel scanning capability or additional operating channels were added by installing additional frequency selection circuitry into the transceiver. Similarly, the tone activated squelch option typically required an additional tone decoder circuit to be installed. Transceiver designers used modular architectures to accommodate additional plug-in "option modules."

An example of this design approach is the prior art "MLS" series radio transceivers manufactured for General Electric Company by Japan Radio Corp. These "MLS" transceivers include basic transceiver circuitry disposed within a housing. The front panel assembly of the transceiver housing was manufactured separately, and consists of a separable front panel "escutcheon" plate. Mechanically mounted to the escutcheon plate is a printed circuit board which plug-connects to the basic transceiver circuitry when the escutcheon plate is mechanically fastened to the housing. The escutcheon plate and associated printed circuit board comprises a module separable from the transceiver main housing and basic circuitry. The module includes user controls mounted on the escutcheon plate and circuitry required to connect user controls mounted on the plate to the transceiver circuitry.

Since different "option" features in many cases require different additional user controls, different models of escutcheon plate modules were produced for the "MLS" series transceivers. In particular, the "MLS" transceiver was made available in five different versions: (1) a two-channel "basic" version; (2) an 8-channel version with the scan feature; (3) a 16-channel version without scan; and (4) a 16-channel version with scan feature. Five different interchangeable escutcheon plates with different user control arrangements corresponding to these five different transceiver versions were also made. The particular escutcheon plate/control panel installed on a particular "MLS" transceiver limited the transceiver features the user could access. For example, the escutcheon plate corresponding to the "MLS" transceiver version with 16-channel capability and no scan feature does not have a control to actuate the scan feature—preventing the user from obtaining the benefit of the scan feature. Similarly, the escutcheon plates corresponding to the 8-channel transceiver versions do not include user controls to access more than 8 channels.

Since all "MLS" transceivers included identical basic transceiver circuitry and main housing, reduced manufacturing costs and increased reliability derived from large scale manufacturing were obtained. Specific purchaser selected options could be provided in a particular unit simply by installing the appropriate escutcheon plate module—a procedure which could be performed in the field if desired. Incorporation of the circuitry performing the option functions and user controls interacting with such circuitry within the same front panel escutcheon plate module permitted a transceiver to be reconfigured by simply "unplugging" one module and "plugging in" a different module (further increasing reliability and decreasing manufacturing costs).

Digital microprocessor controlled radio communications devices such as the "MLS" series transceiver are generally known, of course. The following (by no means exhaustive) listing of prior issued patents is generally relevant to the state of the art of so-called "digital radios":

U.S. Pat. No. 4,378,551—Drapac
U.S. Pat. No. 4,392,135—Ohyagi
U.S. Pat. No. 4,525,865—Mears
U.S. Pat. No. 4,247,951—Hattori et al
U.S. Pat. No. 4,254,504—Lewis et al
U.S. Pat. No. 4,510,623—Bonneau et al
U.S. Pat. No. 4,688,261—Killoway et al U.S. Pat. No. 4,618,997—Imazeki et al Such references teach controlling transceiver functions in addition to transceiver operating parameters (e.g., operating frequencies) in response to digital signals stored in a memory device.

While older radio transceivers required additional circuitry to perform additional, optional functions such as channel scanning, tone activated squelch and the like, modern digital microprocessor controlled transceivers are capable of performing such additional functions under software control with little or no additional circuitry. For example, receiver channel scanning can be implemented by providing an enhanced receiver program control routine which controls the microprocessor to periodically monitor activity on various channels—and additional frequency data can be stored in a memory device to provide additional transceiver operating channels. Additional tone decoding and control algorithms performed by the microprocessor under control of additional program control software can provide advanced squelch control functions, tone signalling functions, and the like.

It would be unfair (and also poor marketing strategy) to make users needing only a minimal transceiver configuration pay for the high development cost of advanced option features and enhancements. Accordingly, for various reasons it is still very much advantageous to offer the purchaser a "basic" lower cost transceiver configuration while permitting him to select additional option features at higher cost—even though the main (or only) difference between the basic and option configured transceivers may reside in the specific program control routines they respectively execute. This marketing strategy allows the manufacturer to offer the basic unit at reduced cost and at the same time requires purchasers requiring enhanced operation to bear the additional costs associated with developing and providing the additional option features. For this marketing strategy to be successful, however, purchasers of low cost basic transceiver configurations must not be able to easily modify their units to obtain more expensive option features.

One possible way to obtain this result is to provide different transceiver configurations, each configuration including a different PROM (programmable read only memory) storing only the subset of the program control instructions and transceiver parameter data associated with that specific configuration. This approach has several disadvantages, however. One important disadvantage is that field "upgrading" of a transceiver is very difficult and time consuming, since the transceiver has to be disassembled, the old PROM removed, and a different PROM installed.

Commonly assigned U.S. Pat. No. 4,525,865 to Mears discloses an arrangement whereby a non-volatile memory within a mobile radio transceiver can be reprogrammed without physical entry or removal of components to provide the radio with additional operational options (e.g., tone or digital addresses, carrier control timers, or the like).

U.S. Pat. No. 4,392,135 to Ohyagi and U.S. Pat. No. 4,378,551 to Drapac disclose security arrangements for enabling and/or inhibiting option features in paging receivers.

Ohyagi teaches an "information setter circuit" comprising an 8×9 bit PROM in which is stored "option selection bits" for selecting various functional options of the paging receiver (e.g., automatic resetting after an alert, paging by mechanical vibration in lieu of tone, and a battery saving feature). The microprocessor reads the information stored in this circuit as an input to the program control algorithm it executes and enables or inhibits the various option features accordingly.

The Drapac patent discloses discrete logic security circuitry incorporated as part of the pager which connects with option selection circuitry contained in a separable "code plug." The code plug includes circuitry which controls tone decoding, and additional simple fusible link type circuitry which controls selection of various options such as battery saving, automatic reset, and dual call operation. Logic level signals are connected through the fusible links in the code plug to the security logic circuitry, and the logic circuitry in turn enables or disables the various options. The security logic circuitry detects when a user tampers with the code plug fusible link connections and prevents activation of the paging device whenever tampering occurs.

While such arrangements may be satisfactory in the context of a paging device, they do not readily lend themselves to the more complex environment of a full-feature digital radio transceiver—in which many more options may be provided and some additional circuitry and user controls may be required to implement the various options. In addition, greater security than Drapac's code plug can provide is necessary to prevent purchasers from successfully enabling transceiver advanced option features through tampering.

The present invention, like the prior art "MLS" series radio transceivers described above, provides different transceiver front panel escutcheon plate modules for different optional transceiver configurations. Unlike the prior art arrangement, however, the present invention does not rely merely on the absence of certain user controls to prevent a user from accessing and operating "option" features of the transceiver. In accordance with the present invention, a security circuit is provided in the module in addition to user controls and associated control circuitry. The security circuit is connected to communicate serial data signals to and from a digital signal controller (e.g., microprocessor) which is part of the main transceiver circuitry. In the preferred embodiment, the security circuit is a single chip programmable logic array which implements certain Boolean logic equations, the specific equations corresponding to a specific option configuration.

The transceiver controller is capable of performing any of various basic and option functions under control of program control instructions stored in a non-volatile memory also part of the main transceiver circuitry. The transceiver controller causes the security circuit to generate a data byte in response to signals provided by the controller, and enables and disables transceiver "options" in response to the value of the generated data byte.

In particular, upon initial application of power to the transceiver, the controller transmits a sequence of digital signals to the security circuit. The security circuit permutes the sequence of signals into a different sequence, the specific permutation used being of arbitrary complexity—and dependent on transceiver "option" features to be enabled. The security circuit communicates the permuted signal sequence in serial form back to the controller. The controller enables (executes) portions of the program control instructions stored in its associated non-volatile memory and disables (does not execute) other portions of the stored program control instructions in response to the sequence received from the security circuit.

The protection against tampering provided by the present invention is far greater than that provided by any of the prior art arrangements described above. This is in part because the security circuit must respond to a serial data sequence which is fleeting and in part because the permutation of that data sequence performed by the security circuit can be an arbitrarily complex function. Far more than mere grounding of pins of a connector or the like would be required to defeat the security circuit and its interaction with the controller. Exact copying of the security circuit might be necessary to duplicate the functionality of the circuit in a form sufficiently miniaturized to be physically disposed on an escutcheon plate.

These and other features and advantages of the present invention will be better and more completely understood by referring to the following detailed description of presently preferred exemplary embodiments in conjunction with the appended sheets of drawings, of which:

FIG. 1 is an exploded perspective view of a presently preferred embodiment of a digital radio transceiver in accordance with the present invention including an escutcheon plate module having a basic control configuration;

FIGS. 2(A) through 2(F) are elevated front views in plan of escutcheon plate modules interchangeable with the escutcheon plate module shown in FIG. 1;

DETAILED DESCRIPTION OF THE PRESENTLY PREFERRED EXEMPLARY EMBODIMENTS

Figure 1:
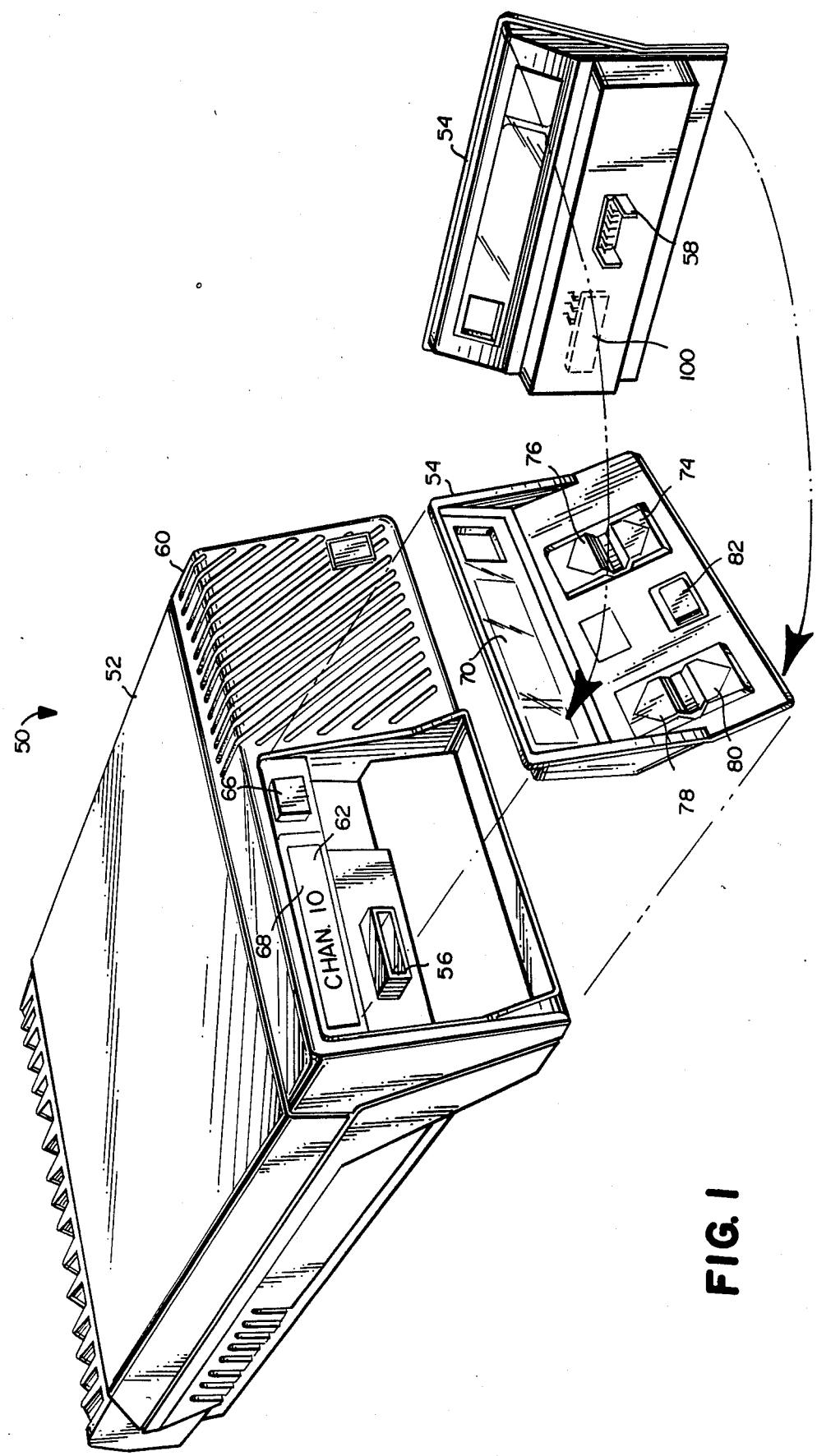

FIG. 1 is an exploded perspective view of a presently preferred exemplary embodiment of a digital radio transceiver 50 in accordance with the present invention. Transceiver 50 includes a main module 52 and an escutcheon plate module 54. Main module 52 is connected to escutcheon plate module 54 mechanically via suitable conventional mechanical fastener and electrically via a conventional mating multi-pin plug 56 (mounted on main module 52) and jack 58 (mounted on escutcheon plate module 54). Escutcheon plate module 54 provides all user-operated controls for transceiver 50 except for power on/off switch 66, as will be explained.

Main module 52 in the preferred embodiment, includes front cap assembly 60, this front cap assembly in turn including a display assembly 62 and an internal speaker (not shown). Front cap assembly 60 is interconnected to other circuitry within main module 52 by a conventional flat ribbon cable (not shown). A microphone connector (not shown) is also provided at the bottom of the front cap assembly 60. Display assembly 62 in the preferred embodiment provides all of the display indicators for transceiver 50, and also includes a power on/off switch 66 which operates to connect/disconnect power to/from main module 52. Display assembly 62 is mounted on the front of front cap assembly 60, with the display 68 being viewable through a window 70 provided as part of escutcheon plate module 54.

If desired, front cap assembly 60 and an internal control board associated with it may be separated from housing 72 of main module 52 and installed in a remote control head for mounting under vehicle dashboards and the like. If this alternate arrangement is used, a blank plate is mounted on main module housing 72 in place of front cap assembly 60, and escutcheon plate module 54 is connected to the front cap assembly which in turn is mounted on the remote control head.

In the preferred embodiment, transceiver 50 has certain "basic" operating functions (e.g., transmitting and receiving on at least two radio frequency channels) but may also be equipped with additional "option" functions such as multichannel capability, external public address, and tone activated squelch. In the preferred embodiment, identical main modules 52 are used regardless of which options a particular transceiver 50 is configured for. There are seven different interchangeable versions of escutcheon plate module 54 in the preferred embodiment—and the particular version of the escutcheon plate module which is installed on a particular transceiver 50 determines which option functions, if any, the transceiver is capable of performing. In the preferred embodiment, all that is necessary to reconfigure a particular transceiver 50 to provide different option functions is to remove its escutcheon plate module 54 and replace it with a different version of the module.

The seven different interchangeable versions of escutcheon plate module 54 provided in the preferred embodiment are shown in FIG. 1 and FIGS. 2A–2F. Module version 54(1) shown in FIG. 1 is for the "basic" transceiver configuration with no "option" functions. This basic transceiver configuration operates alternately on either of two different radio frequency channels. User controls mounted on escutcheon plate module version 54(1) include a channel 1 selector button 74, a channel 2 selector button 76, volume up and volume down buttons 78, 80, and a "monitor" ("MON") button 82. A user of transceiver 50 provided with the "basic" escutcheon plate module version 54(1) may select transceiver operations on either a preassigned channel 1 or a preassigned channel 2, increase or decrease speaker volume level, and select between a muted mode and a monitor mode by manipulating user controls 74–82.

Figure 2A:
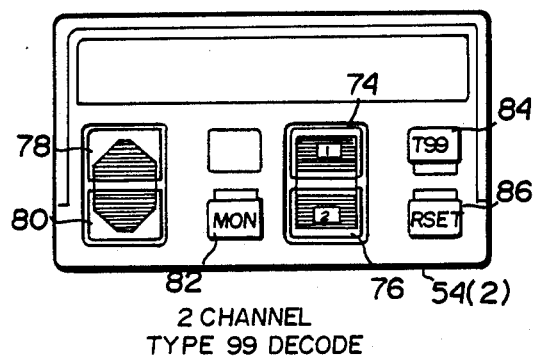

The escutcheon plate module version 54(2) shown in FIG. 2A enables transceiver 50 to perform all of the basic functions permitted by module 54(1), and adds the additional function of a "Type 99 decode". Additional user controls 84, 86 permit the user to selectively (a) enable this decode function (by depressing the "T99" control 84) and (b) reset the decode function (by depressing "RSET" control 86). The T99 decode option when enabled prevents the squelch of transceiver 50 from opening except when a preprogrammed 2-tone signal is received.

Transceiver 50 equipped with escutcheon plate module version 54(3) provides all of the basic functions it would provide if equipped with escutcheon plate module version 54(1) and, in addition, provides multichannel and scan operation. More particularly, the "channel 1" and "channel 2" controls 74, 76 of escutcheon plate module version 54(1) now have "up channel" and "down channel" functions, respectively, and in addition, a "scan" control 88 is also provided. A user may select any one of sixteen channels for transceiver operation by operating control 74, 76, and may also place transceiver 50 in a "scan" mode in which the transceiver scans until it detects activity on one of the sixteen preprogrammed channels and pauses on (monitors) the active channel for the duration of communications on that channel.

Figure 2D:
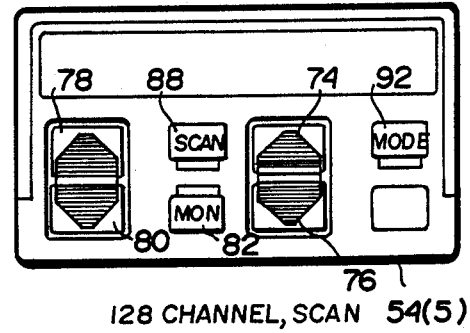
Figure 2B:
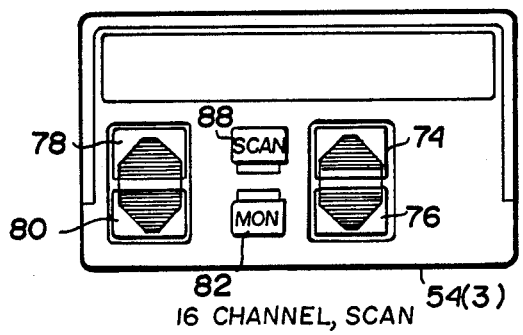
Figure 2E:
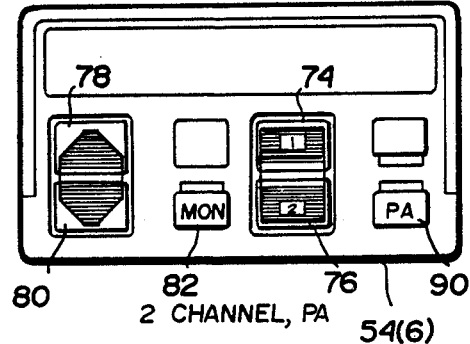
Figure 2C:
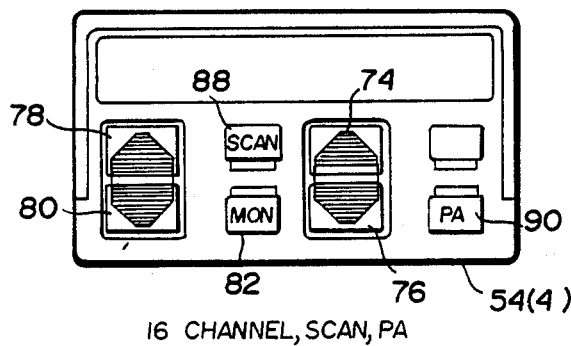

Escutcheon plate module version 54(4) shown in FIG. 2C is identical to version 54(3) shown in FIG. 2B except that version 54(4) also provides public address "option" function enabled by "PA" control 90. Depression of PA control 90 routes the audio output of an audio amplifier within front cap assembly 60 to an external speaker output (not shown) to provide public address operation.

Escutcheon plate module version 54(5) shown in FIG. 2D provides transceiver 50 with 128 channel capability as well as scan operation. Controls 74, 76 perform the same functions in module version 54(5) as they perform in version 54(3), but an additional "mode" select control 92 is also provided in the version 54(5) to select between logical groups of the 128 channels.

Escutcheon plate module version 54(6) shown in FIG. 2E provides 2-channel operating capability and the public address "optional" function.

Figure 2F:
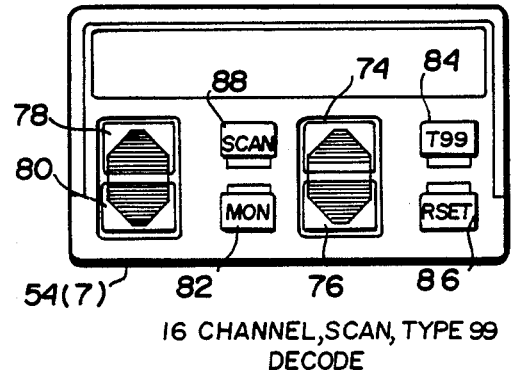

Escutcheon plate module version 54(7) shown in FIG. 2F provides 16-channel operation with scan in addition to the T99 decode feature.

It will be understood from reviewing the various "basic" and "option" features provided by the various interchangeable escutcheon plate modules 54 that in the preferred embodiment, three different "option" features may be provided: (1) 2-channel verses multichannel operation; (2) public address capabilities; and (3) T99 decode squelch control. In addition, the multichannel operation option has two sub options: (a) 16-channel operation with scan; and (b) 128 channel operation with scan.

The following Table I summarizes the various different "option" functions provided by transceiver 50 when connected to the various different interchangeable escutcheon plate modules 54:

TABLE I

| Module | Channels | Public Address | T99 Decode |
|--------|----------|----------------|------------|
| 54(1)  | 2        | no             | no         |
| 54(2)  | 2        | no             | yes        |
| 54(3)  | 16       | no             | no         |
| 54(4)  | 16       | yes            | no         |
| 54(5)  | 128      | no             | no         |
| 54(6)  | 2        | yes            | no         |
| 54(7)  | 16       | no             | yes        |

In the preferred embodiment, one of the factors which determines the operational capabilities of a particular transceiver 50 is the particular user control configuration provided by the escutcheon plate module version 54 installed on the transceiver—just as in the prior art "MLS" transceiver arrangement discussed previously. For example, a transceiver 50 equipped with escutcheon plate module 54(1) does not have public address capability because there is no user control for selecting between internal and external loud speaker (internal speaker is the default state). Similarly, escutcheon plate module version 54(1) has no controls for activating or resetting T99 decode squelch control, and thus prevents the user from accessing this feature of transceiver 50. However, if the availability of user controls was the only mechanism of transceiver 50 preventing the user from accessing certain "option" functional characteristics (as it is in the "MLS" transceivers), users might attempt to modify or replace escutcheon plate module 54 so as to add missing controls.

In accordance with the present invention, more than mere modification of the control configuration is required to add "option" features to transceiver 50. In particular, most of the escutcheon plate modules 54 shown in FIGS. 1, 2A–2F, include a security circuit 100 (shown in phantom in FIG. 1) which interacts with a digital controller within main module 52 to enable or disable the multichannel and T99 decode squelch control option features of transceiver 50.

Figure 3A:
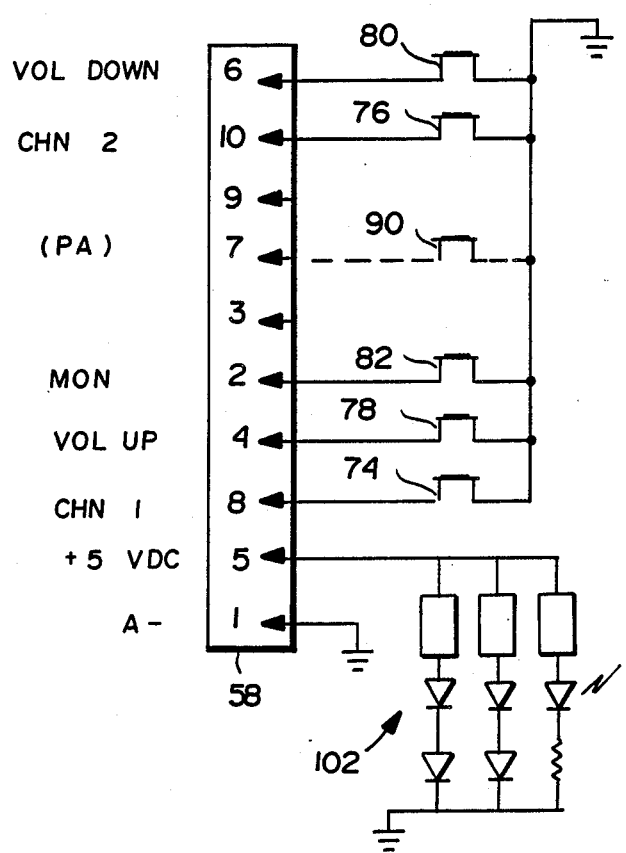
FIG. 3(A) is a schematic diagram of the escutcheon plate modules shown in FIGS. 1 and 2(E)

FIG. 3A is an electrical schematic diagram of escutcheon plate module versions 54(1) and 54(6)—these two module versions lacking a security circuit 100. Various pins of jack 58 are connected to controls 74–82, 90. These pins are connected to ground when the associated control is depressed (all controls of module 54 are momentary-on single-pole single-throw switches in the preferred embodiment). In the preferred embodiment, these pins are maintained at a logic level 1 signal level through pull-up resistors or the like. The voltage potential on a pin is lowered to logic level 0 whenever the switch 74–82, 90 connected to it is depressed. Transceiver 50 senses changes in the logic level of the various pins of jack 58 and responds accordingly.

Figure 3B:
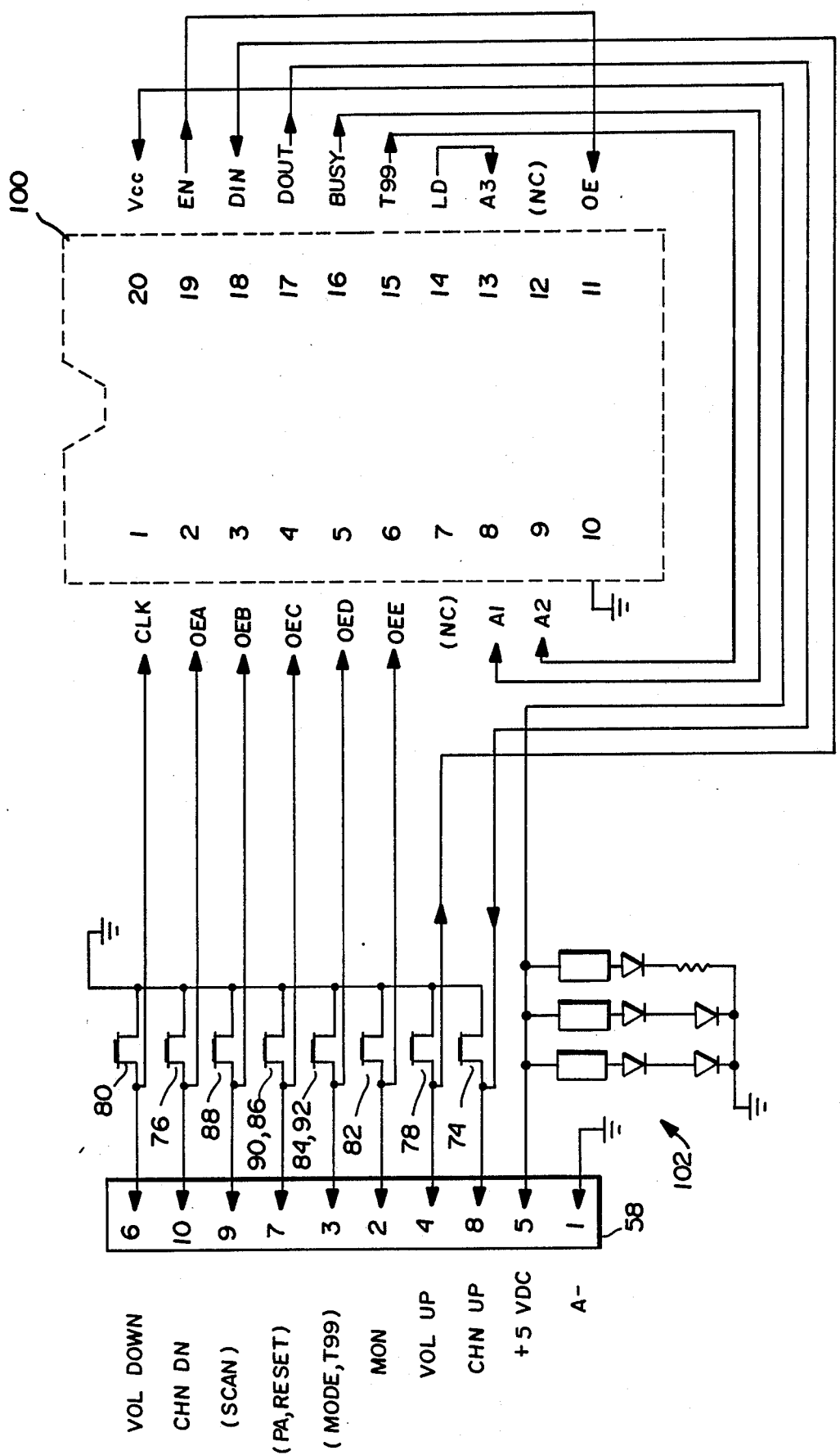
FIG. 3(B) is a schematic diagram of the escutcheon plate modules shown in FIGS. 2(A)–2(D) and 2(F)

FIG. 3B is a schematic diagram of escutcheon plate module versions 54(2)–54(5) and 54(7). In addition to various additional controls 84, 86, 88 (not shown in the FIG. 3A schematic diagram), these escutcheon plate module versions also include a security circuit 100 which in the preferred embodiment is a preprogrammed monolithic programmable logic array ("PAL") model P16R4 commercially available from MMI. This PAL is a 20-pin programmable logic array with latched outputs and implements "sum of products" combinatorial logic—thus providing a miniaturized equivalent of a large array of discrete AND and OR gates.

In the preferred embodiment, security circuit 100 is connected to the same pins of jack 58 to which controls 74–92 are connected. Security circuit 100 in the preferred embodiment processes data only upon power-up of transceiver 50 (as will be explained in greater detail shortly), and is therefore able to share jack 58 pins with controls that are only operated after power-up. In the preferred embodiment, the user should not operate any of the controls mounted on escutcheon plate module 54 until a few seconds after depressing power on/off switch 66 in order to give security circuit 100 time to complete its data processing functions and release the data lines connected to jack 58 for use as indicators of the states of controls 80–92. This dual function use of jack 58 increases reliability and reduces manufacturing costs of transceiver 50, since a 10-pin jack is all that is required to electrically connect escutcheon plate module 54 to transceiver main module 52.

Security circuit 100 pin 20 in the preferred embodiment is supplied with power from jack 58 pin 5, and pin 10 of the security circuit is grounded. A clock synchronizing signal "CLK" is connected to jack 58 pin 6 (to which is also connected the "volume down" control 80). Various enable input lines "OEx" at security circuit pins 2–6 are connected to jack 58 pins 10, 9, 7, 3 and 2, respectively.

The "data in" (DIN) pin 18 of security circuit 100 is connected to jack 58 pin 4 (to which is also connected the "volume up" control 78), and the security circuit "data out" (DOUT) pin 17 is connected to jack 58 pin 8 (to which is also connected the channel 1 or channel up control 74). Security circuit 100 enable (EN) pin 19 is connected back to the output enable (OE) pin 11 of the security circuit; the "busy" output at pin 16 is connected back to input A1 at pin 8; additional output "T99" at pin 15 in the preferred embodiment is connected back to input A2 at pin 9; and the load output LD at pin 14 is connected back to the A3 input at pin 13. Pins 12 and 7 of security circuit 100 are not connected in the preferred embodiment.

The basic operation of security circuit 100 will now be described. Data input bits supplied to security circuit data input DIN pin 18 (via jack 58 pin 4) are processed in sequence by a preprogrammed combinatorial logic array equivalent within security circuit 100, and outputs T99, LD, BUSY, DOUT, and EN are generated in response to the logic level present at the DIN input and also in response to the signals applied to input pins OEA, OEB, OEC, OED, OEE, A1, A2, A3 and OE (some of these inputs being tied to latched previous state outputs generated by the security circuit). Data outputs available at security circuit pins 14–19 are latched by internal latches within the security circuit in response to edges of the synchronization signal applied to the "CLK" input of the security circuit—so that the security circuit output signal levels change only upon the occurrence of a rising edge of the signal applied to the CLK input. In addition, these outputs must be enabled by the presence of signals on enable pins 2–6 in the preferred embodiment.

Figure 5:
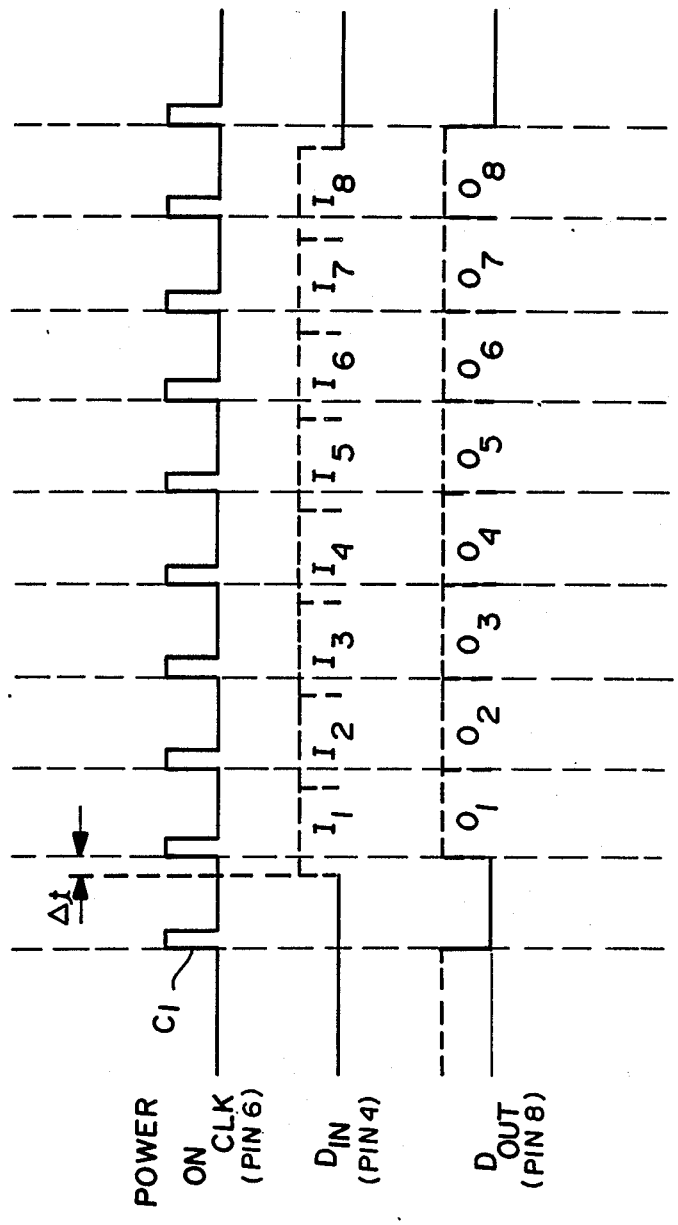
FIG. 5 is a timing diagram of exemplary signals exchanged in the preferred embodiment between the transceiver and the escutcheon plate module.

The preferred mode of operation of security circuit 100 is shown in the FIG. 5 timing diagram. An initial clock pulse Cl is applied to security circuit CLK pin 1 in order to initialize the state of the security circuit internal output latch. Then, an input signal level $I_1$ is applied to the security circuit DIN input and a short time later (this time being sufficient to allow for gate propagation delays) the security circuit "CLK" input is clocked again to latch the responsive outputs generated by the various gate array equivalents in the security circuit. The input level at security circuit input DIN is then changed, and another clock pulse is applied to the CLK input. This process continues for eight different serial data input bits D1–D8 in the preferred embodiment to produce eight corresponding output bits 01–08 at security circuit output pin DOUT. In the preferred embodiment, each bit 0 is determined by the value of the input bit I present at the DIN input of security circuit 100 at the time a clock pulse occurs, and is also determined by the values present at security circuit output pins 14–19 at that time. In addition, the occurrences of data output bits 0 are in corresponding timed relation with the occurrences of clock pulses at jack 58 pin 6 in the preferred embodiment.

The values of the output bits 01–08 are determined by the Boolean logic which security circuit 100 has been preprogrammed to provide. In the preferred embodiment, four different versions of security circuit 100 are used to distinguish between five different combinations of option features. These different versions of security circuit 100 provide identical programmable logic arrays P16R4 programmed differently to provide different Boolean logic functions. The following table summarizes the option feature selection performed by the different security circuits:

TABLE II

| Security Circuit | Channels | T99 Decode |
|---|---|---|
| None | 2 | no |
| A | 16 | yes |
| B | 128 | no |
| C | 16 | no |
| D | 2 | yes |

In the preferred embodiment security circuit type A is used to indicate 16-channel operation with the T99 decode option feature, and is thus installed in escutcheon plate module version 54(7) shown in FIG. 2F. Security circuit type B selects 128-channel capability with no T99 decode, and is thus found in escutcheon plate module version 54(5). Security circuit version C selects 16-channel capability with no T99 decode, and is found in escutcheon plate module versions 54(3) and 54(4). Security circuit type D selects 2-channel capability with the T99 decode option, and is found in escutcheon plate module version 54(2). The absence of security circuit 100 selects no T99 decode and only 2-channel capability (as is present for escutcheon plate module versions 54(1) and 54(6) in the preferred embodiment).

The only difference between security circuit 100 versions A, B, C and D in the preferred embodiment is the way that they are programmed. Security circuit 100 in the preferred embodiment is programmed in a conventional manner using an EPROM programmer with a programmable logic array adapter. Those skilled in the art understand how to program programmable logic arrays such as those used in the preferred embodiment security circuit 100 to implement Boolean logic equations, and no further discussion of the programming details is therefore necessary. In the preferred embodiment, security circuitry 100 version A implements the following set of "sum of products" Boolean logic equations:

EQUATION SET (A)

$EN = $ NOT $(\overline{OEA} \cdot \overline{OEB} \cdot \overline{OEC} \cdot \overline{OED} \cdot \overline{OEE})$ $LD = $ NOT $(\overline{A1}\,\overline{A2}\,\overline{A3}\ DIN\ +$
$\quad\quad\quad\quad A1\,\overline{A2}\,A3\ DIN\ +$
$\quad\quad\quad\quad A1\,A2\,\overline{A3}\ DIN\ +$
$\quad\quad\quad\quad A1\,A2\,A3\ DIN\ +$
$\quad\quad\quad\quad OEA\ OEB\ OEC\ OED\ OEE)$ $T99 = $ NOT $(\overline{A1}\,\overline{A2}\,\overline{A3}\,\overline{DIN}\ +$
$\quad\quad\quad\quad A1\,\overline{A2}\,\overline{A3}\,\overline{DIN}\ +$
$\quad\quad\quad\quad A1\,A2\,\overline{A3}\ DIN\ +$
$\quad\quad\quad\quad A1\,A2\,A3\ DIN\ +$
$\quad\quad\quad\quad OEA\ OEB\ OEC\ OED\ OEE)$ $BUSY = $ NOT $(\overline{A1}\,\overline{A2}\,\overline{A3}\ DIN\ +$
$\quad\quad\quad\quad\quad A1\,\overline{A2}\,\overline{A3}\,\overline{DIN}\ +$
$\quad\quad\quad\quad\quad A1\,A2\,A3\ DIN\ +$
$\quad\quad\quad\quad\quad OEA\ OEB\ OEC\ OED\ OEE)$ $DOUT = $ NOT $(\overline{A1}\,\overline{A2}\,\overline{A3}\ DIN\ +$
$\quad\quad\quad\quad\quad\ A1\,\overline{A2}\,A3\ DIN\ +$
$\quad\quad\quad\quad\quad\ A1\,A2\,\overline{A3}\ DIN\ +$
$\quad\quad\quad\quad\quad\ OEA\ OEB\ OEC\ OED\ OEE)$ The Boolean logic equations implemented by security circuit 100 version B is shown below:

EQUATION SET (B)

$EN = \text{NOT} \ (\overline{OEA} \ \overline{OEB} \ \overline{OEC} \ \overline{OED} \ \overline{OEE})$ $LD = \text{NOT} \ (\overline{A1} \ A2 \ \overline{A3} \ DIN \ +$
$\overline{A1} \ A2 \ A3 \ \overline{DIN} \ +$
$A1 \ \overline{A2} \ A3 \ DIN \ +$
$A1 \ A2 \ A3 \ DIN \ +$
$OEA \ OEB \ OEC \ OED \ OEE)$ $T99 = \text{NOT} \ (\overline{A1} \ \overline{A2} \ A3 \ DIN \ +$
$A1 \ \overline{A2} \ A3 \ DIN \ +$
$A1 \ A2 \ \overline{A3} \ \overline{DIN} \ +$
$A1 \ A2 \ A3 \ DIN \ +$
$OEA \ OEB \ OEC \ OED \ OEE)$ $BUSY = \text{NOT} \ (\overline{A1} \ \overline{A2} \ \overline{A3} \ DIN \ +$
$\overline{A1} \ A2 \ A3 \ \overline{DIN} \ +$
$A1 \ \overline{A2} \ A3 \ DIN \ +$
$A1 \ A3 \ \overline{A3} \ \overline{DIN} \ +$
$OEA \ OEB \ OEC \ OED \ OEE)$ $DOUT + \text{NOT} \ (\overline{A1} \ \overline{A2} \ \overline{A3} \ DIN \ +$
$\overline{A1} \ A2 \ A3 \ DIN \ +$
$A1 \ \overline{A2} \ A3 \ DIN \ +$
$OEA \ OEB \ OEC \ OED \ OEE)$ Version C of the security circuit 100 implements the following Boolean equation:

EQUATION SET (C)

$EN = \text{NOT} \ (\overline{OEA} \ OEB \ \overline{OEC} \ \overline{OED} \ \overline{OEE})$ $LD = \text{NOT} \ (\overline{A1} \ \overline{A2} \ \overline{A3} \ DIN \ +$
$\overline{A1} \ A2 \ \overline{A3} \ \overline{DIN} \ +$
$A1 \ A2 \ A3 \ DIN \ +$
$OEA \ OEB \ OEC \ OED \ OEE)$ $T99 = \text{NOT} \ (A1 \ \overline{A2} \ \overline{A3} \ \overline{DIN} \ +$
$A1 \ \overline{A2} \ A3 \ DIN \ +$
$A1 \ A2 \ A3 \ DIN \ +$
$OEA \ OEB \ OEC \ OED \ OEE)$ $BUSY = \text{NOT} \ (\overline{A1} \ \overline{A2} \ \overline{A3} \ DIN \ +$
$A1 \ \overline{A2} \ A3 \ DIN \ +$
$A1 \ A2 \ A3 \ \overline{DIN} \ +$
$OEA \ OEB \ OEC \ OED \ OEE)$ $DOUT = \text{NOT} \ (\overline{A1} \ \overline{A2} \ \overline{A3} \ DIN \ +$
$\overline{A1} \ A2 \ \overline{A3} \ \overline{DIN} \ +$
$A1 \ A2 \ A3 \ \overline{DIN} \ +$
$A1 \ A2 \ A3 \ DIN \ +$
$OEA \ OEB \ \overline{OEC} \ OED \ \overline{OEE})$ Security circuit version D is preprogrammed to implement the Boolean logic equations shown below:

EQUATION SET (D)

$EN = \text{NOT} \ (\overline{OEA} \ \overline{OEB} \ \overline{OEC} \ \overline{OED} \ \overline{OEE})$ $LD = \text{NOT} \ (\overline{A1} \ \overline{A2} \ A3 \ \overline{DIN} \ +$
$A1 \ A2 \ A3 \ DIN \ +$
$\overline{A1} \ A2 \ A3 \ \overline{DIN} \ +$
$OEA \ OEB \ OEC \ OED \ OEE)$ $T99 = \text{NOT} \ (\overline{A1} \ \overline{A2} \ A3 \ \overline{DIN} \ +$
$A1 \ A2 \ \overline{A3} \ DIN \ +$
$OEA \ OEB \ OEC \ OED \ OEE)$ $BUSY = \text{NOT} \ (\overline{A1} \ A2 \ A3 \ \overline{DIN} \ +$
$A1 \ \overline{A2} \ \overline{A3} \ DIN \ +$
$A1 \ A2 \ \overline{A3} \ DIN \ +$
$OEA \ OEB \ OEC \ OED \ OEE)$ $DOUT = \text{NOT} \ (\overline{A1} \ \overline{A2} \ \overline{A3} \ DIN \ +$
$\overline{A1} \ \overline{A2} \ A3 \ \overline{DIN} \ +$
$\overline{A1} \ A2 \ \overline{A3} \ DIN \ +$
$A1 \ A2 \ \overline{A3} \ DIN \ +$
$A1 \ A2 \ A3 \ DIN \ +$
$OEA \ OEB \ OEC \ OED \ OEE)$ As can be seen from the Boolean logic equations, each intermediate output LD, T99, busy and EN in the preferred embodiment is formed by ORing together a plurality of terms, each of these ORed terms being formed by ANDing at least four inputs (complemented or uncomplemented, depending upon the term). One of the four inputs being ANDed in each term is the serial data input bit DIN (complemented or uncomplemented). The other three inputs are obtained from outputs of the security circuitry 100 itself. Each gate array equivalent implemented by security circuit 100 in the preferred embodiment has its latched output connected back to its input—that is, the output generated by a particular equation is dependent on the previous output state generated by the same equation. For example, the equations producing the LD output include A3 input terms—and the LD output is connected to the A3 input of security circuit 100. One of the equations implemented by each version of security circuit 100 produces an output EN which requires all of inputs OEA, OEB, OEC, OED, OEE to be at logic level zero in order for outputs DIN, DOUT, BUSY, T99 and LD to be enabled (the EN output is connected back to the output enable OE input); and each of the other Boolean logic equations implemented by security circuit 100 requires at least one of inputs OEA, OEB, OEC, OED, OEE to be at logic level zero if the output generated by that equation is to be responsive to DIN and to the current output state of the security circuit—this feature preventing the security circuit from generating outputs after "power-on" which might interfere with the scanning of the states of controls 74–92.

Of course, security circuit 100 can implement virtually any desired set of logic equations. For example, a programmable logic element or other programmable device could be used instead of the PAL security circuit 100 in the preferred embodiment to provide more complex logic. The PAL used in the preferred embodiment provides only "sum of products" logic with latched output. However, other programmable devices are available which include additional flexibility (so that, for example, the logic implemented could be any combination of "sum of products" and "product of sums", and could even include delays, storage elements or the like). The logic equations implemented by security circuit 100 can be of arbitrary complexity, and in general, more complex equations are preferred over less complex equations in order to safeguard against tampering. The output produced by security circuit 100 is some function of its input (and also preferably some function of its previous output) in the preferred embodiment, and it is critical that the security circuit output is "predictable" (i.e., the security circuit always produces the same series of output when simulated by a given series of inputs).

Figure 4:
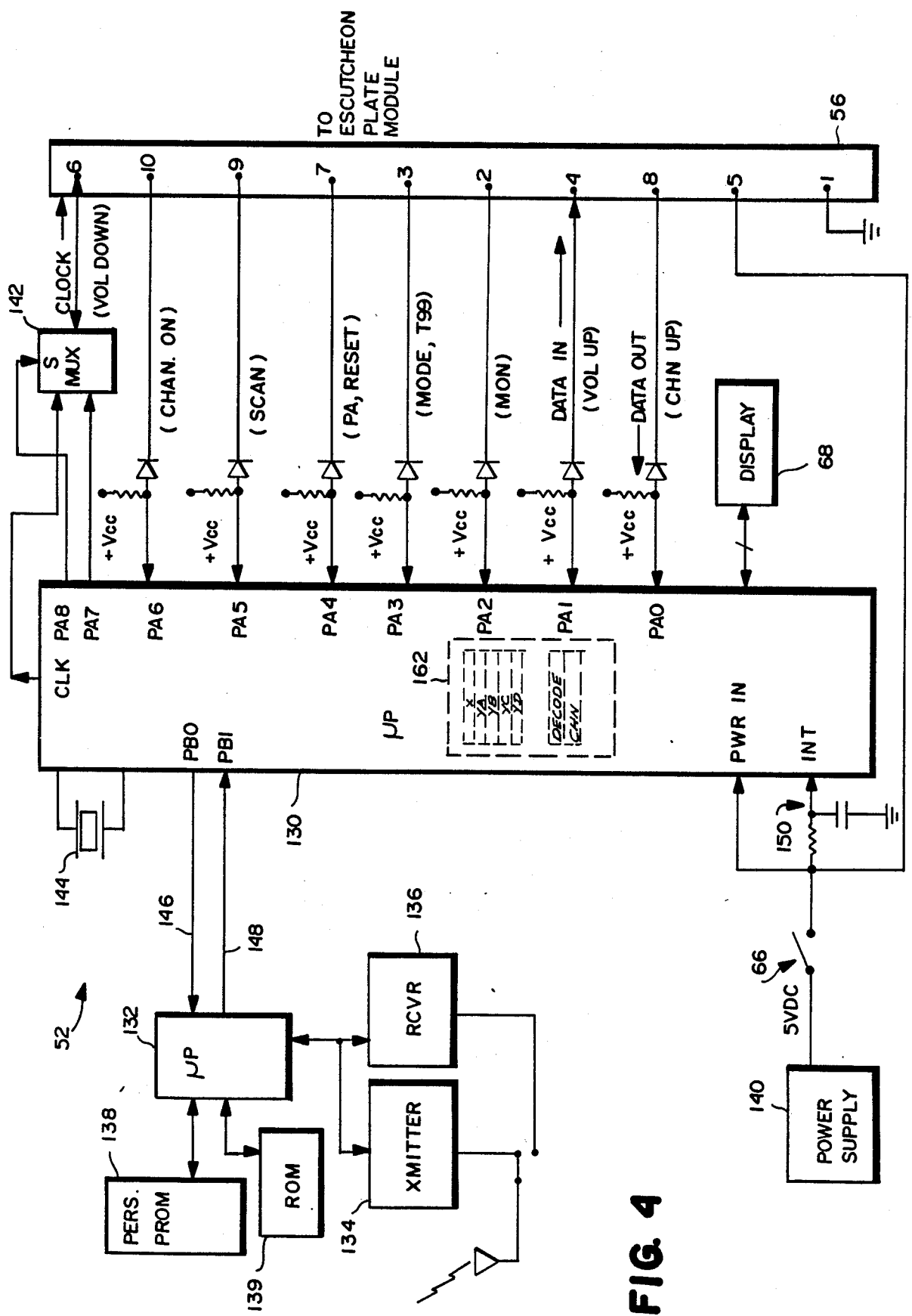
FIG. 4 is a schematic block diagram of the transceiver shown in FIG. 1.

FIG. 4 is a schematic diagram of transceiver main module 52 in the preferred embodiment. Main module 52 includes a control microprocessor 130, a main module processor 132, transmitter and receiver RF circuits 134, 136, a "personality PROM" 138, a power supply (or other source of power) 140, a multiplexer 142, and a quartz crystal 144. Control microprocessor 130 sends and receives data to/from main radio processor 132 via serial data lines 146, 148. Schmitt triggered hex inverters (not shown) are used to buffer these serial lines to reduce noise and data error problems. Both serial lines 146, 148 normally rest at plus 5 volts, with data causing the lines to go low. Display 68 is connected to an output port of control microprocessor 130, which converts serial data received from main radio processor 132 into the data format needed to drive display 68. While power on/off switch 66 is shown connected in series with power supply 140, in the preferred embodiment switch 66 momentarily grounds a line which feeds conventional switching circuitry, this conventional switching circuitry in turn connecting and disconnecting power supply 140 from the circuitry of transceiver 50. In the preferred embodiment, transceiver 50 is typically used in mobile applications, so that power supply 140 is fed from a 12 volt dc source.

Plug 56 connects to control microprocessor 130 input port PA via lines which are normally pulled high to plus 5 volts by 500K ohm pull-up resistors (in the preferred embodiment, these resistors are part of control microprocessor 130). A closure of any of controls 74–92 of an escutcheon plate module 54 connected to plug 56 grounds the corresponding input port line of control microprocessor 130. Diodes on these lines (shown schematically in FIG. 4) protect control microprocessor 130 from static discharges. Control microprocessor 130 converts each switch closure to serial data, which it sends via serial data line 146 to main radio processor 132 for appropriate response.

Figure 6:
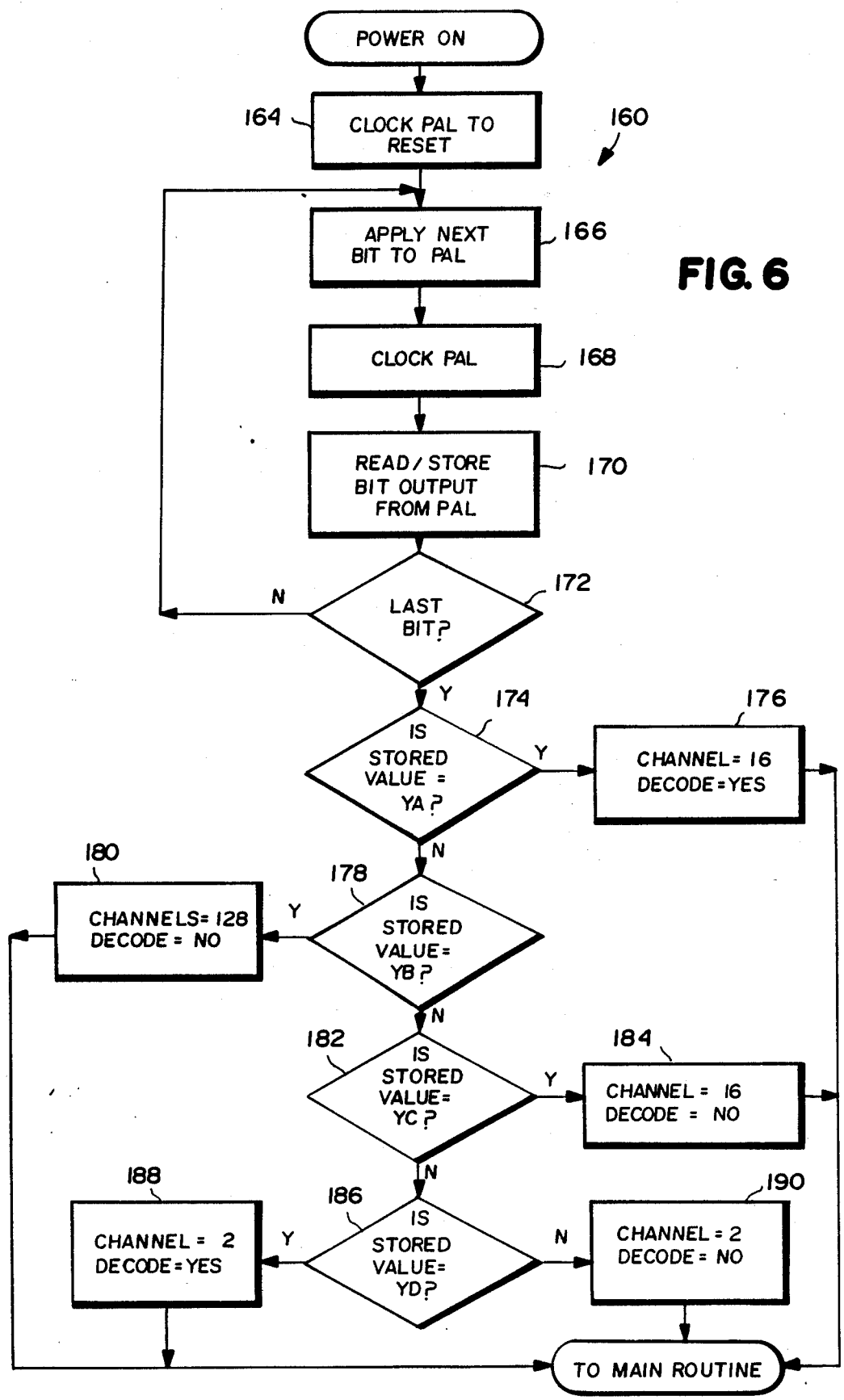
FIG. 6 is a flowchart of exemplary program control steps performed by the transceiver shown in FIG. 4.

Control microprocessor 130 includes an interrupt capability which causes the microprocessor to execute a power-on interrupt routine (although a conventional RC network 150 connected to an "INT" input of the control microprocessor is shown in FIG. 4, the microprocessor may alternatively include internal circuitry which causes it to "trap" to a power-on interrupt "vector" when power is first applied to it). FIG. 6 is a flow chart of exemplary program control steps performed by control microprocessor 130 when power is first applied to it. This power-on interrupt routine 160 is stored in the preferred embodiment in a non-volatile memory 162 (which may be internal or external to control microprocessor 130, and may include, for example, a random access memory internal to the microprocessor and a read only memory external to the microprocessor). Memory 162 stores program control instructions corresponding to power-on routine 160, as well as additional program control instructions executed by control microprocessor 130 after power on and during normal operation. In addition, memory 162 stores values X, YA, YB, YC and YD, and also stores a flag called DECODE decode and a memory variable called CHANNEL. The operation of control microprocessor 130 during power-on conditions will now be described in connection with FIGS. 4–6.

Upon power-on, the first thing control microprocessor 130 does in the preferred embodiment (after possibly executing a "self test" routine) is to apply a clock pulse to jack 56 pin 6 (which is connected to security circuit 100 CLK pin 1 if an escutcheon plate module 54 with a security circuit is installed) (block 164). In the preferred embodiment, control microprocessor 130 generates clock pulses at its CLK output pin at a frequency determined by quartz crystal 144, these clock signals being used to synchronize other devices connected to the microprocessor. In the preferred embodiment, jack 56 pins 6 is usually used to sense the state of "volume down" control 80, and therefore should not always be connected to the control microprocessor clock signal. Multiplexer 142 (which may comprise either a hard-wired external discrete multiplexing device or a software-controlled multiplexer equivalent implemented by control microprocessor 130) applies microprocessor clock pulses to jack 56 pin 6 only during power-up (as is shown in FIG. 5). Control microprocessor 130 causes jack 56 pins 10, 9, 7, 3, 2, 4 to all be at appropriate predetermined logic levels upon application of the first clock pulse to security circuit 100 so that the security circuit output is forced into a predetermined desired initial output state.

Control microprocessor 130 then applies a data bit $I_1$ (e.g., the first bit of an 8-bit X value stored in memory 162) to the security circuit 100 DIN input (via jack 56 pin 4) (block 166). As described previously, the application of an input bit causes the logic array implemented by security circuit 100 to respond by applying resulting data bits to its internal output latch input. After a gate propagation delay time has passed, control microprocessor 130 again clocks security circuit 100 (via jack 56 pin 6) to latch that data into the security circuit output latch (block 168). Control microprocessor 130 then reads the data bit security circuit 100 has latched at its DOUT output (via jack 56 pin 8) and stores that bit into an internal microprocessor register (block 170). Control microprocessor 130 then accesses the next bit of the predetermined memory value X stored in memory 162. If bits remain in this memory constant which have not yet been applied to security circuit 100 (block 172), blocks 166–172 are repeated for the remaining bits of memory constant X (to apply input bits $I_2$–$I_8$ to security circuit input DIN and to receive and store the resulting security circuit outputs $O_2$–$O_8$) Memory constant X may be of arbitrary length, but in the preferred embodiment it is eight bits long so that by the end of this process control microprocessor 130 has stored in its internal register an 8-bit long output value $O_1$–$O_8$ which it has received in serial fashion from security circuit 100 in response to (a) the 8-bit input value sent to the security circuit, and (b) the security circuit initial state.

Control microprocessor 130 then compares the output byte 0 obtained from security circuit 100 with four different values stored as constants YA, YB, YC and YD.

If the string of output bits received from security circuit 100 is identical to the string of bits YA (as tested for by decision block 174), security circuit 100 has been programmed to implement equation set (A) and is therefore part of escutcheon plate module version 54(7). Control microprocessor 130 sets the DECODE flag to YES and sets the CHANNEL variable to 16 (block 176).

If decision block 174 reveals that the value returned by security circuit 100 is not equal to the YA value, decision block 178 tests whether this return value is equal to constant YB. If so, then security circuit 100 has been preprogrammed to implement equation set (B) and is therefore part of an escutcheon plate module version 54(5). Control microprocessor 130 sets the DECODE flag to no and sets the CHANNEL memory variable to 128 (block 180).

If the value returned by security circuit 100 is equal to constant YC, on the other hand (as tested for by decision block 182), security circuit 100 implements the equation set (C) and thus corresponds to escutcheon plate module version 54(3) or 54(7). In this instance, control microprocessor 130 sets the CHANNEL variables to 16 and sets the DECODE flag to NO (block 184).

Finally, if the test of decision blocks 174, 178 and 182 have all failed, the value received from security circuit 100 is compared with the value of constant YD (decision block 186). If decision block 186 reveals that the data returned by security circuit 100 is identical to the constant YD, then security circuit 100 must implement equation set (D) and must therefore be part of an escutcheon plate module version 54(2). Control microprocessor 130 sets the CHANNEL variable to the value of 2, and sets the DECODE flag to yes.

If the tests of all the blocks 174, 178, 182 and 186 fail, then no options are enabled and microprocessor 130 sets the CHANNEL variable to the default value of 2 and the DECODE flag to default value of no (block 190). Various conditions may cause all these tests to fail. Once such condition is that no security circuit 100 is connected to jack 56. As is shown in FIG. 3A, escutcheon plate module versions 54(1) and 54(6) do not include a security circuit 100. If no security circuit 100 is present, the values read by block 170 will all be at logic level 1 in the preferred embodiment and will not correspond to any of constants YA-YD. Another condition that could cause all these tests to fail is that the security circuit 100 is malfunctioning or is partially disconnected (a possible indication of tampering). Because tests 174, 178, 182, 186 are very strict (i.e., the value returned by the security circuit 100 must exactly match one of four expected values and must be in timed relation with the occurrence of clock pulses generated by control microprocessor 130), only a circuit which returns precise expected values at the correct times will satisfy the tests.

An important feature of the invention is that security circuit 100 responds to a changing input value. While security circuit 100 returns the same output value string for a given input value string, it will return a different (but expected and predictable) output value showing for a different given input value string. In accordance with the present invention, the input string value X stored in memory 162 is not known by the user and cannot be predicted by the user. While it might be possible to analyze signals produced by transceiver 50 in order to determine what that X value is for a particular transceiver, different serial numbers of transceiver 50 could store different X values—so that a simplified security system 100 designed to return a particular fixed value each time it is clocked might only work for one specific transceiver 50. If desired, transceiver 50 can even change the value X it uses on successive power-ups. For example, transceiver 50 could calculate (using a random or pseudo-random process) a new input string value X upon each power-up, calculate the expected value to be returned by equation sets (A)-(D), and use those calculated values as constants YA-YD, respectively. In this particular arrangement, it would not be possible for someone to defeat the security provided by security circuit 100 by merely replacing the security circuit with, for example, a programmable shift register which would load and shift a constant value in response to clock pulses received from main module 52.

In the preferred embodiment, the values stored in the channel variable and the DECODE flag are communicated via serial data line 146 to main radio processor 132. These values are used to selectively enable or disable portions of programming stored in read only memory 139. In the preferred embodiment, conventional program control instructions stored in ROM 139 include alternate routines accessed via branching dependent upon the DECODE and CHANNEL values returned by control microprocessor 130. For example, the conventional channel control portion of the control algorithm stored in ROM 139 reads frequency allocation values stored in personality PROM 138 and controls transmitter 134 and receiver 136 to operate on a specific frequency pair (channel) selected from personality PROM 138 data in response to signals present on jack 56 pin 6 (channel down) and pin 8 (channel up) after power-up routine 160 has completed and control microprocessor 130 begins executing a conventional main routine which simply senses (scans) the state of the various pins of jack 56 and returns corresponding encoded values to main radio processor 132. In the preferred embodiment, personality PROM 138 is a read/write memory device that can be programmed by an equipment dealer using an appropriate conventional GE radio programmer. A portion of personality PROM 138 is set aside to store data corresponding to up to 128 different radio frequency channels. Main radio processor 132 only accesses as many channels as is indicated by the value of the CHANNEL variable sent to it by control microprocessor 130, however. That is, if the CHANNEL variable has a value of 2, main radio processor 132 only accesses two different channels stored in personality PROM 138 at predetermined storage locations in the personality PROM and totally ignores all other channel data stored in the personality PROM. Thus, even if a dealer were to program personality PROM 138 with all of the data necessary for 128 channel operation and the T99 decode function, the particular security circuit 100 (or absence of it) in the escutcheon plate module 54 would prevent main radio processor 132 from using all but the specific data stored in personality PROM 138 corresponding to the options enabled by the escutcheon plate module.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

What is claimed is:

1. An escutcheon plate module adapted for connection to a digital radio transceiver of the type which generates clock synchronization signals and applies said clock synchronization signals to an electrical connector, said module comprising:

connection means for separable engaging with said digital radio transceiver connector;

user control means connected to said connection means for applying control signals to said connection means in response to user manipulation thereof; and security circuit means connected to receive said clock synchronization signals via said connection means for applying a predictable sequence of serial output signals to said connection means in timed relation with the occurrence of said clock synchronization signals.

2. A module as in claim 1 wherein: said connection means includes a first electrical pin;

said user control means applies a first electrical signal to said first pin in response to said user manipulation; and said security circuit means also applies said sequence of output signals to said first pin.

3. A module as in claim 1 wherein said security circuit means includes means for processing input date signals applied thereto by said digital radio transceiver to produce said sequence of serial output signals.

4. A module as in claim 1 wherein said security circuit includes:

output latch means for latching signals applied thereto in response to the occurrence of said clock synchronization signals and for applying said latched signals to said connection means as said sequence of output signals; and logic gate array means responsive to said latched signals for generating signals to be subsequently latched by said output latch means.

5. A module as in claim 4 wherein said logic gate array means includes means for processing input data provided by said digital radio transceiver in accordance with a "sum of products" Boolean logic equation.

6. A module as in claim 5 wherein said logic array means includes means for combining a plurality of terms with the OR Boolean logic function and means for generating said plurality of terms from input signals with the AND Boolean logic function, at least one of said input signals being generated by said digital radio transceiver, the remainder of said input signals being provided by said output latch means.

7. An escutcheon plate module adapted for connection to a digital radio transceiver of the type which includes a multi-pin electrical connector including first, second and third pins, said escutcheon plate module comprising:

connector means for electrically connecting with said digital radio transceiver connector first, second and third pins;

user control means connected to said connector means for applying first, second and third control signals to said first, second and third pins in response to user manipulation thereof; and security circuit means connected to said first, second and third pins via said connector means for receiving said clock synchronization signals present on said first pin, for receiving a sequence of input data signals present on said second pin, for permuting said input data signals to thereby generate a sequence of corresponding output signals, and for applying said output signal sequence to said third pin via said connector means in timed response to said clock synchronization signals.

8. In a digital radio transceiver of the type which includes a multi-pin electrical connector including first, second and third pins, a method of selectively enabling and disabling option features comprising:

(1) electrically connecting with said digital radio transceiver connector firs, second and third pins;

(2) applying a first control signal to said first pin in response to a first user manipulation;

(3) applying a second control signal to said second pin in response to a second user manipulation;

(4) applying a third control signal to said third pin in response to a third user manipulation;

(5) receiving clock synchronization signals present on said first pin;

(6) receiving a sequence of input date signals present on said second pin;

(7) permuting said input data signals to thereby generate a sequence of corresponding output signals;

(8) applying said output signal sequence to said third pin via said connector means in timed response to said clock synchronization signals; and (9) enabling said digital radio transceiver to perform a first set of functions and disabling said digital radio transceiver from performing a second set of functions in response to the identity of said output signal sequence.

9. In a digital radio transceiving system for transmitting and receiving radio frequency signals of the type including a microprocessor for performing first and second radio transceiving functions in response to program control instructions stored in a memory associated therewith, a method of operating said system comprising the following steps:

(a) applying a serial stream of digital input signals from said microprocessor to a security circuit operatively connected thereto;

(b) receiving a responsive serial digital output signal stream from said security circuit with said microprocessor;

(c) comparing said received serial digital output signal stream with a first digital value predetermined by said serial digital input signal stream;

(d) If said comparing step (c) reveals said serial digital output signal stream matches said first value, enabling said first radio transceiving function;

(e) if said comparing step (c) reveals said serial digital output signals do not match said first value, disabling said first radio transceiving function; and (f) enabling said second radio transceiving function regardless of the results of said comparing step (c).

10. A digital radio transceiving system including:

radio frequency means for transmitting and receiving radio frequency signals on radio frequency channels, and a microprocessor, connected to control said radio frequency means and responsive to predetermined program control instructions, said microprocessor including:

means for applying serial digital input signals to a security circuit operatively connected thereto, means for receiving serial digital output signals from said security circuit, means for comparing said received serial digital output signals with a value predetermined by said serial digital input signals, means for enabling said radio frequency means to operate of any RF channel within a first set of preprogrammed radio frequency channels and for also enabling said radio frequency means to operate on any RF channel within a second set of preprogrammed radio frequency channels if said comparing means reveals said serial digital output signals match said predetermined value, and means for enabling said radio frequency means to operate on any RF channel within said first set of preprogrammed radio frequency channels and for disabling said radio frequency means from operating on channels within said second set of preprogrammed RF channels if said comparing means reveals said serial digital output signals do not match said predetermined value.

11. An escutcheon plate for disengageably connecting to the front panel of a radio frequency transceiver, said escutcheon plate comprising:

a particular configuration of user control means for controlling said transceiver to perform basic radio transceiving functions and additional optional radio transceiving functions associated with said particular configuration;

security circuit means for receiving a serial digital signal input from said transceiver, for permuting said serial digital signal input to a serial digital signal output corresponding to said particular user control means configuration, and for communicating said serial digital signal output to said transceiver to enable said transceiver to perform said additional optional radio transceiving functions, and electrical connecting means for electrically connecting said user control means and said security circuit means to said radio frequency transceiver.

* * * * *